United States Patent [19]
Burns et al.

[11] Patent Number: 5,259,061
[45] Date of Patent: Nov. 2, 1993

[54] FABRICATION AND PHASE TUNING OF AN OPTICAL WAVEGUIDE DEVICE

[75] Inventors: William K. Burns, Alexandria; Catherine H. Bulmer, Springfield, both of Va.; Arthur S. Greenblatt, Silver Spring, Md.

[73] Assignee: The United States of America as represented by the Secretary of the Navy, Washington, D.C.

[21] Appl. No.: 976,742

[22] Filed: Nov. 16, 1992

Related U.S. Application Data

[62] Division of Ser. No. 766,939, Sep. 27, 1991, Pat. No. 5,195,163.

[51] Int. Cl.$^5$ ............................................. G02B 6/00
[52] U.S. Cl. ...................................................... 385/132
[58] Field of Search ............................. 385/132, 49; 219/121.69, 121.6, 121.85

[56] References Cited

U.S. PATENT DOCUMENTS 4,266,850  5/1981  Burns ........................... 350/96.14
5,059,763  10/1991  O'Brien et al. ................ 385/49 X

OTHER PUBLICATIONS

C. H. Bulmer, Sensitive, Highly Linear Lithium Niobate Interferometers For Electromagnetic Field Sensing, Appl. Phys. Lett. 53(24), 12 Dec. 1988, pp. 2368-2370.

Howerton et al., Effect of Intrinsic Phase Mismatch on Linear Modulator Performance of the 1×2 Directional Coupler and Mach-Zehnder Interferometer, J. of Lgtwave Tech. vol. 8, No. 8, Aug. 1990, pp. 1177-1186.

Brannon et al., Excimer Laser Etching of Polyimide, J. Appl. Phys., 58 (5), 1 Sep. 1985, pp. 2036-2043.

Primary Examiner—Akm E. Ullah
Attorney, Agent, or Firm—Thomas E. McDonnell; Charles J. Stockstill

[57] ABSTRACT

The manufacture of an optical waveguide device utilizing a fast, accurate method for tuning of the output phase angle of such devices to a desired operating point. Tuning is accomplished by adjusting the accumulated phase along a waveguide arm of the device by removing optical waveguide material using laser ablation. Due to the change in waveguide geometry in the ablated region, the optical phase velocity is changed and thus the optical path length is affected in that section of waveguide, thereby resulting in a change in output phase angle.

2 Claims, 3 Drawing Sheets

FABRICATION AND PHASE TUNING OF AN OPTICAL WAVEGUIDE DEVICE

This is a division of co-pending application Ser. No. 07/766,939 filed Sep. 27, 1991, U.S. Pat. No. 5,195,163.

FIELD OF THE INVENTION

The present invention relates generally to waveguide fabrication and in particular to the adjustment of the phase angle of an optical waveguide device.

BACKGROUND OF THE INVENTION

In order to optimize modulator linearity and thereby maximize the linear dynamic range of optical waveguide devices, the phase angle is important. Normally, the phase angle in optical waveguide devices must be precise for optimum performance, e.g., directional couplers require phase matching and a precise coupling length for proper performance and Mach-Zehnder interferometers require an optical phase difference of 90° between the arms of the interferometer for linear operation. The precise achievement of the required phase angle is very hard to obtain since phase velocity in optical devices depends on material indices and waveguide geometry.

Currently, the manufacture of optical waveguide devices having a plurality of arms or paths is imprecise. Because the lengths of the arms or paths form a balanced or unbalanced bridge for providing a built-in phase bias, the desired phase relationships between the paths or arms is difficult to obtain during fabrication due to the differences in phase velocity along the paths. Currently utilized methods to tune optical waveguide devices by phase velocity adjustment, e.g., lithographic oxide cladding of the areas over certain parts of the structure and annealing by a $CO_2$ laser beam, are relatively slow and of limited accuracy because the preciseness of control is lacking. These processes are cumbersome, do not provide for instantaneous observation of the results and small changes in the waveguide cross-section are difficult to achieve. Manufacture of optical waveguides can currently take weeks, and the final product's accuracy is limited because in situ measurement and correction are not possible.

As the utilization of optical waveguide devices becomes more prevalent in the optical-electronic industry, it is desirable that procedures to overcome the lack of precision control over the quality of the manufactured product be developed.

SUMMARY OF THE INVENTION

It is the general purpose and object of the present invention to quickly, economically and accurately tune an optical waveguide device during manufacture.

Another object is to precisely adjust the phase angle of an optical waveguide device after manufacture to obtain a different phase angle from the original phase angle.

These and other objects of the invention can be accomplished during or after fabrication. When a measurement of the output phase angle of the device shows a variation from the desired value, the accumulated phase angle along the waveguide is adjusted by removing optical waveguide material through laser ablation. Due to the change in optical waveguide geometry in the ablated region, a change in optical phase velocity results, thereby affecting the optical path length in that section of the waveguide. As a result, the output phase angle of the device is changed and is subject to instantaneous measurement. If measurement subsequent to the initial laser ablation determines that the desired phase angle is not present at the output of the device, the ablation procedure is repeated until the precise adjustment is achieved. In multiple channel devices, precise adjustment of the output phase angle of any such device can be achieved by tuning each device in turn by its required amount.

Other objects and advantages of the invention will become apparent from the following detailed description of the invention when considered in conjunction with the accompanying drawings.

DETAILED DESCRIPTION OF THE PREFERRED EMBODIMENTS

Figure 1:
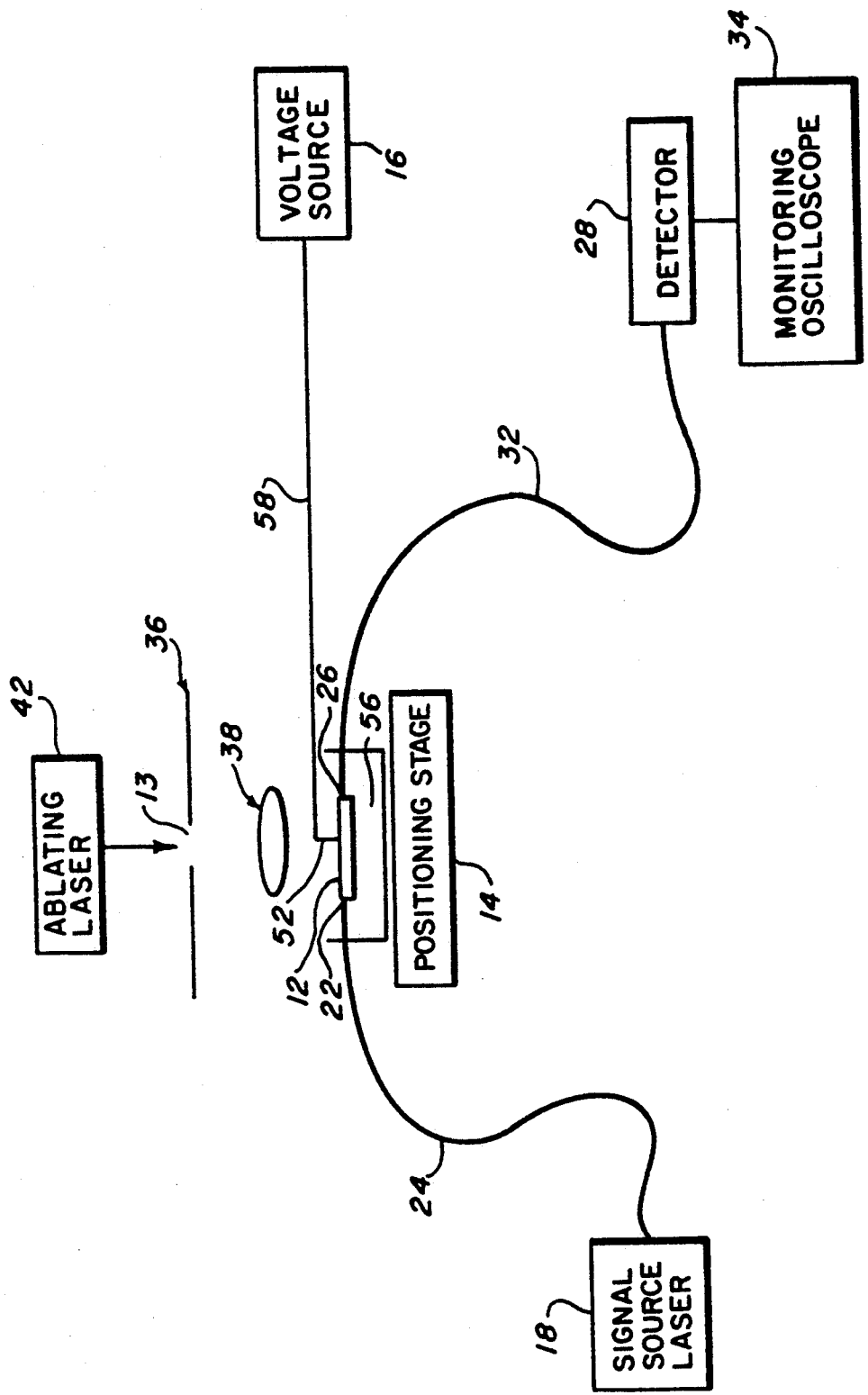
FIG. 1 shows an arrangement for performing laser ablation and monitoring phase angle of an optical waveguide device.

The system of the present invention for phase tuning an optical waveguide device is shown in FIG. 1, along with the interconnection of various components necessary for precise phase tuning of singlemode channel optical waveguide devices during or after fabrication.

An optical waveguide device 12 to be phase-tuned is placed on a positioning stage 14 within the aperture 13 of an ablating laser beam 42 whose aperture is controllable to a micrometer, or less, resolution by beam shaping shutters 36 and attached to a voltage source 16. A signal source laser 18 is connected to an input 22 of the device 12 by a polarization-preserving input fiber optic cable 24. (The frequency of the signal generated by the signal source laser 18 is immaterial to the invention). A detector 28, capable of measuring the laser signal at the output 26 of the device 12, is connected by a fiber optic cable 32 to the device 12. To monitor the results of the phase tuning procedure, an oscilloscope 34, or similar means, is attached to the detector 28.

The ablating laser beam 42 is aligned with a segment of the optical waveguide fiber in the device 12 selected for ablation and shaped utilizing beam shaping shutters 36 and a focusing lens element 38. Positioning of the laser beam 42 is done so as not to have any of the supporting structure of the device 12 within the focus of the laser beam 42.

With the laser 42 so positioned, and with the transmitting laser source 18 activated, the output phase angle or bias, $\phi_0$, is measured. After one pulse of laser exposure by the ablating laser 42, $\phi_0$ is remeasured. Variations in the change of output phase angle, $\Delta\phi_0$, due to ablation are achieved either by changing the energy of the laser beam 42 or shifting the locus of the laser beam 42 along the optical waveguide fiber to an undisturbed segment, or both.

Ablating lasers with good ablation characteristics are essential to the tuning process. Because the excimer laser beam has an appropriate ultraviolet (uV) wavelength to achieve ablation (material removal without heating), it is preferred. Shaping of the ablating laser beam geometry by the use of precision shutters 36, to a micrometer or less, permits precise positioning of the ablating laser beam 42 on the waveguide section 54 to be ablated. Variation of the ablating laser 42 energy/pulse permits the removal of a very small amount of the optical waveguide 54. Because the invention permits the monitoring of small changes in phase resulting from this removal, the invention can iteratively and controllably trim the output phase of the optical waveguide, as desired.

As used in this procedure, the term ablation refers to the removal of material from the surface of the optical waveguide channel by wearing away, erosion, melting, vaporization without heating of the surface of the optical waveguide material.

Figure 2:
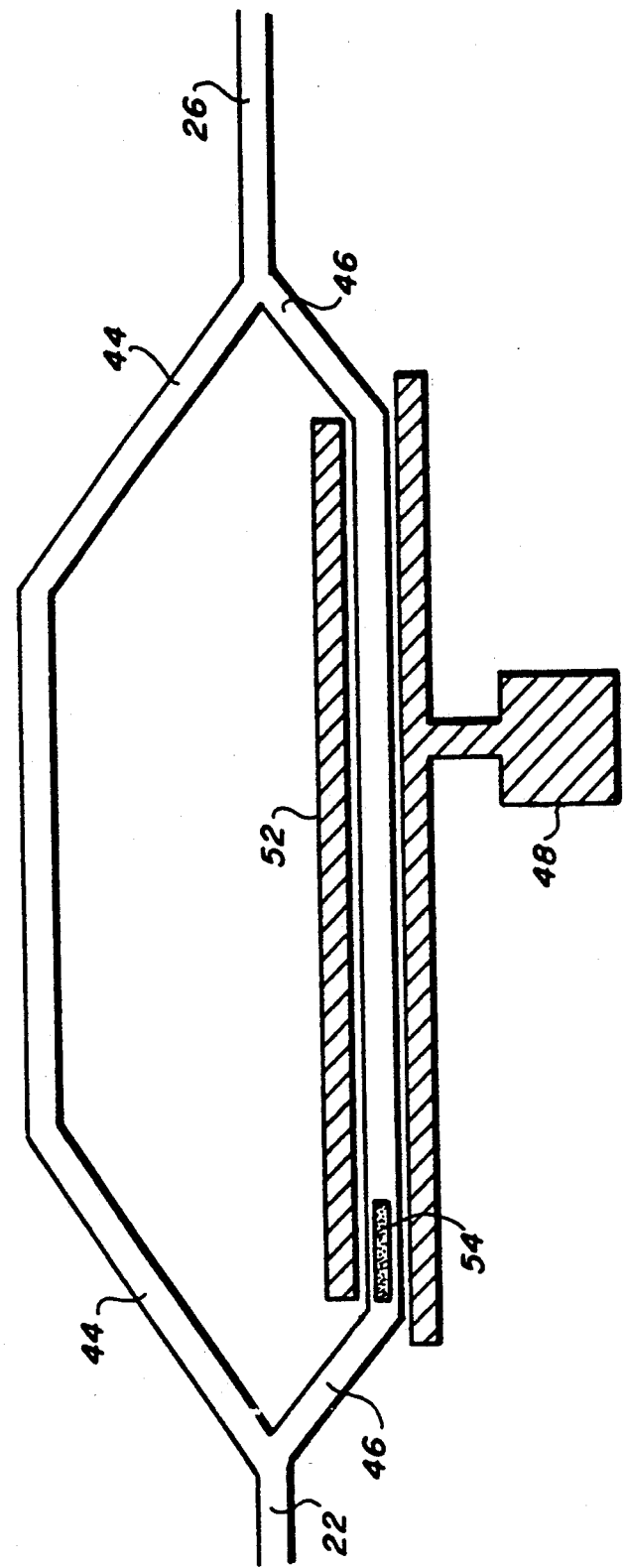
FIG. 2 shows a view, partially in section, of an interferometric modulator configuration, with a laser-ablated section.

In an experiment utilizing a Mach-Zehnder Interferometer formed in X-cut, Y- propagating (the cut being immaterial to the success of the procedure) Ti-diffused LiNbO$_3$, of the type shown in Burns, U.S. Pat. No. 4,266,850, which is hereby incorporated by reference, and in FIG. 2, herein; a phase angle adjustment to achieve a $\phi_0$ of 90° was accomplished in the following manner. The optical signal was transmitted along two paths 44,46 of a singlemode channel optical waveguide, of unequal length, with electrodes 48,52 placed on either side of the channel waveguides paths 44,46. An area ablated is, in this instance, a 4 by 160 μm area 54 of one side of a channel waveguide (arm) 46. A 4 μm width, centered in a ~7 μm wide channel waveguide 46, allowed easy ablation without exposure of the electrodes 48,52. (For a Z-cut device, with electrodes 52,54 over channels 44,46, or an X-cut device with a passivation layer over the electrodes 48,52, laser trimming could be performed on lengths of the interferometer waveguide channels 44,46 before the electrode 48 section.)

For this and the subsequent experiment, interconnection of the system devices was accomplished as shown in FIG. 1. The Mach-Zehnder Interferometer 12 was fiber-coupled and packaged in a box 56, the lid of which was not sealed so that access to the optical channel surface was possible. A 1.3 μm laser source 42 coupled to the interferometer input 22 was switched on and the output 26 power coupled 32 to a detector 28 which was monitored using an oscilloscope 34. A ~1 kHz voltage source 16 was connected by a cable 58 to the modulator electrodes 48,52. The Mach-Zehnder 12 was placed on a positioning stage 14 under an excimer laser beam 42. Using beam shaping shutters 36 and focusing lens 38, the laser beam 42 was shaped and aligned so as to expose a certain area 54 of one waveguide arm 46 (typically 4 ×160 μm$^2$). With the laser 42 positioned, the output phase angle, $\phi_0$, was measured. After a one pulse laser exposure or event, $\phi_0$ was remeasured and found to be greater than the desired $\phi_0$ of 90°. To move $\phi_0$ toward the desired 90°, a further length of the same arm 46 was exposed to the pulse laser event. (If the phase angle change, $\Delta\phi_0$, after ablation exceeds the desired value, a segment located on the other optical waveguide channel 44 is ablated, and the above steps are repeated until the desired value of the phase angle $\phi$ is achieved.)

A quantitative change in phase angle, $\Delta\phi_0$, due to ablation was varied by changing laser energy. For calibration purposes, single pulse laser 42 exposures, each over an area of 4 by 160 μm$^2$, were made on portions of each interferometer arm 44,46.

Figure 3:
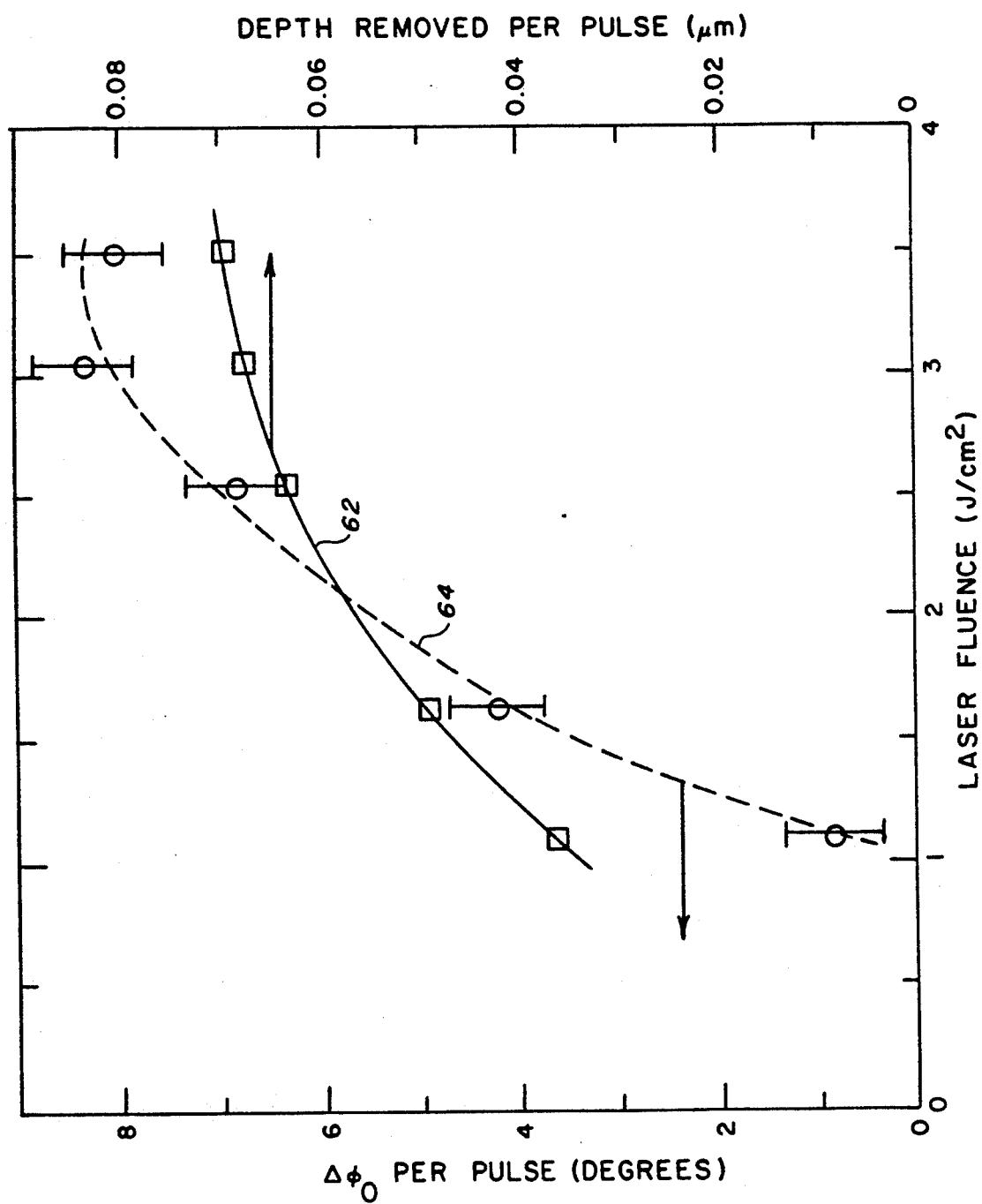
FIG. 3 shows the change in phase bias, $\Delta\phi_0$, (dashed line) and depth of material removed (solid line), per pulse, as a function of laser fluence on the substrate of the interferometric modulator.

The results of this experiment when graphically represented, as shown in FIG. 3, show a relationship of laser fluence to the amount of material removed 62 and the change of phase angle, $\Delta\phi_0$, per laser pulse 64. The depth of material removed is measured in an area of blank LiNbO$_3$ exposed to 100 pulses and is the average depth trimmed per pulse. (The depth per pulse varies from 0.036 to 0.069 μm.) The $\Delta\phi_0$ is measured for one pulse of 4×160 μm$^2$ beam size. Relatively large angular changes are achieved for a 160 μm long, single laser pulse, for instance $\Delta\phi_0=6.8°$ for a 2.6 J/cm$^2$ fluence, which allows a nominal accuracy of 0,04° in the definition of $\phi_0$ by using a single pulse of 4 μm width and of length variable in 1 μm steps. Angle changes of ~0.8° to 8° are achieved for fluences of 1.1 to 3.5 J/cm$^2$. At fluences of greater than ~3 J/cm$^2$, the magnitude of the change in angle appeared to saturate. The measurement method used has a ±0.5° error; angle determinations based on the measured relative harmonic contents of the modulated light give greater accuracy.

In another experiment wherein both optical paths were ablated, a Mach-Zehnder Interferometer with an initial phase angle of 102° was first tuned to 116° by a two pulse exposure on one arm 46. Several exposures on the other arm 44 decreased the angle to 90° (±0.5° measurement error). For the last pulse the exposed area 54 was 4×90 μm$^2$, a length being chosen from calibration of previous angle changes. Typically, the excimer laser 42 fluence used was ~2.6 J/cm$^2$ at the 248 nm wavelength. After tuning $\phi_0$ remained stable at its new value. The total loss in the Mach-Zehnder Interferometer 12 was observed to be 0.5 dB greater than before the laser ablation. Most of the loss occurred with just the first pulse; subsequent ablations, which each joined on the edge of the previous one along the arm 44, caused much smaller increases in loss.

The experiments conducted achieved a fast (within minutes), accurate tuning of the phase bias of a Mach-Zehnder interferometric modulator. Tuning of optical guided devices manufactured using proton-exchanged LiNbO$_3$ or LiTaO$_3$ is accomplished by a process similar to the simple tuning procedure demonstrated with a Ti:diffused LiNbO$_3$ modulator.

Because of the preciseness and controllability of the laser ablation over that of the prior art; optical waveguide devices, such as the interferometric waveguide amplitude modulator shown in Burns, can be fabricated and tuned during the production of the device without rejection of devices failing to meet the output phase requirements specified. This results in more reliability and far less waste of materials due to poor production runs.

Because the excimer laser can be precisely shaped and positioned, no photolithographic processing is required. The trimming process is optically monitored and in-situ measurement of phase bias angle and subsequent correction are performed. Because of this controllability, one can trim the output phase angle of optical waveguides devices, simply, during manufacture and thereafter.

Utilizing the method shown, or a configuration to achieve a similar result, phase angle tuning is performed on any optical waveguide device whose operating point depends on waveguide phase velocity, e.g., interferometers, directional couplers, 1×2 directional couplers, linear voltage sensors and digital optical switches, etc. Furthermore, the phases of any devices on the same substrate can be tuned individually, each device being tuned by a different amount depending on the correction required. This allows arrays of optical waveguide devices, such as optimally linear modulators (or modulators with any other desired phase characteristics), to be fabricated on one substrate. Because of the advantages of excimer laser ablation over the prior art, the invention can produce the necessary trimming of such optical waveguides in far less time, thus further increasing the efficiency with which one can manufacture optical waveguide devices.

The phase tuning approach of this invention facilitates the fabrication and use of optical waveguide devices. The invention is shown in what is considered to be the most practical and preferred embodiment, and is done so for purposes of illustration rather than limitation. For example, although the invention is presently of interest in the production of Mach-Zehnder Interferometers, it is also used for directional couplers and other such devices previously enumerated, in accordance with any material system which absorbs an appropriate wavelength, e.g., ultra violet.

Accordingly, the scope of the invention is to be discerned solely by reference to the appended claims, wherein: what is claimed and desired to be secured by Letters Patent of the United States is:

1. An optical waveguide device having one or more optical channel waveguide paths, the improvement comprising one or more laser ablated portions on the surface of said optical channel or channels to precisely remove optical channel waveguide material thereby tuning the phase angle of the device to a desired phase angle by varying the optical length of the optical waveguide path.

2. A device as recited in claim 1, wherein said device is a Mach-Zehnder interferometer.

* * * * *